United States Patent
Bergström et al.

(10) Patent No.: US 9,503,994 B2
(45) Date of Patent: Nov. 22, 2016

(54) NETWORK NODE, USER EQUIPMENT AND METHODS THEREIN FOR ADJUSTING THE TRANSMIT TIMING OF UPLINK TRANSMISSIONS

(75) Inventors: Mattias Bergström, Stockholm (SE); Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 13/583,505

(22) PCT Filed: Jun. 20, 2012

(86) PCT No.: PCT/SE2012/050692
§ 371 (c)(1),
(2), (4) Date: Sep. 7, 2012

(87) PCT Pub. No.: WO2013/119160
PCT Pub. Date: Aug. 15, 2013

(65) Prior Publication Data
US 2013/0201911 A1    Aug. 8, 2013

Related U.S. Application Data

(60) Provisional application No. 61/595,856, filed on Feb. 7, 2012.

(51) Int. Cl.
*H04W 56/00*        (2009.01)

(52) U.S. Cl.
CPC ......... *H04W 56/00* (2013.01); *H04W 56/0045* (2013.01)

(58) Field of Classification Search
CPC .................................... H04W 56/00
USPC ........................ 370/328, 336, 329
See application file for complete search history.

(56) References Cited

U.S. PATENT DOCUMENTS

| | | | |
|---|---|---|---|
| 8,462,688 B1* | 6/2013 | Dinan | 370/312 |
| 2007/0149206 A1* | 6/2007 | Wang | H04W 36/0077 455/450 |

(Continued)

OTHER PUBLICATIONS

New Postcom, "Timing Reference Cell Selection for TA Group," 3GPP TSG RAN SG2 Meeting #76, San Francisco, USA, Nov. 14-18, 2011; pp. 1-4; R2-115739; Mobile Competence Centre; 650, Route Des Lucioles; F-06921 Sophia-Antipolis Cedex; France, [retrieved on Nov. 8, 2011] Section 2.2.

(Continued)

*Primary Examiner* — Parth Patel
(74) *Attorney, Agent, or Firm* — Coats & Bennett, P.L.L.C.

(57) ABSTRACT

A method in a user equipment for adjusting a transmit timing of uplink transmissions to a network node in a telecommunications system is provided. The user equipment is configurable with more than one aggregated serving cells. The reception timing of a downlink transmission from a timing reference serving cell is used as a timing reference for the transmit timing of uplink transmissions. The user equipment determines a change to a second serving cell as the new timing reference serving cell which is different from a first serving cell currently being used as the timing reference serving cell. The user equipment applies an incremental adjustment of the transmit timing of uplink transmissions for the serving cells in a group of serving cells with respect to a timing reference based on the reception timing of a downlink transmission from the second serving cell in the user equipment.

47 Claims, 9 Drawing Sheets

(56) References Cited

U.S. PATENT DOCUMENTS

| | | | |
|---|---|---|---|
| 2008/0002660 A1* | 1/2008 | Jeong | H04B 7/2681 370/350 |
| 2008/0232278 A1* | 9/2008 | Brunel | H04W 56/0045 370/275 |
| 2009/0186613 A1* | 7/2009 | Ahn et al. | 455/434 |
| 2009/0191887 A1* | 7/2009 | Goto | H04W 28/22 455/450 |
| 2009/0232236 A1* | 9/2009 | Yamamoto | H04W 56/0005 375/260 |
| 2009/0279495 A1* | 11/2009 | Yoo | 370/329 |
| 2010/0309877 A1* | 12/2010 | Damnjanovic et al. | 370/331 |
| 2011/0085491 A1* | 4/2011 | Tynderfeldt et al. | 370/315 |
| 2011/0223932 A1* | 9/2011 | Hole et al. | 455/456.1 |
| 2012/0257569 A1* | 10/2012 | Jang et al. | 370/328 |
| 2013/0021979 A1* | 1/2013 | Kwon et al. | 370/328 |
| 2013/0114574 A1* | 5/2013 | Ng | H04W 56/0045 370/336 |
| 2013/0188473 A1* | 7/2013 | Dinan | 370/216 |
| 2013/0188618 A1* | 7/2013 | Dinan | 370/336 |
| 2013/0195084 A1* | 8/2013 | Chen et al. | 370/336 |
| 2013/0250925 A1* | 9/2013 | Lohr et al. | 370/336 |
| 2013/0322397 A1* | 12/2013 | Lee et al. | 370/329 |

OTHER PUBLICATIONS

Samsung, Ericsson, St-Ericsson, Issues on SCell Timing Reference; 3GPP TSG-RAN WG2#77 Meeting, Dresden, Germany, Feb. 6-10, 2012; pp. 1-3; R2-120504. Retrieved on Jan. 31, 2013, Retrieved from Internet: http://www.3gpp.org/ftp/tsg_ran/WG2_RL2/TSGR2_77/docs/.

Catt, "Timing Reference Change", 3GPP TSG RAN WG2 Meeting #77, Dresden, Germany, Feb. 6-10, 2012, pp. 1-2, R2-120252; Mobile Competence Centre; 650, Route Des Lucioles; F-06921 Sophia-Antipolis Cedex; France, [retrieved on Jan. 31, 2012].

Huawei, "Different Timing Advance Impact on Carrier Aggregation", 3GPP TSG RAN SG2 Meeting #67bis, Miyazaki, Japan; Oct. 12-16, 2009; R2-095815; Mobile Competence Centre; 650, Route Des Lucioles; F-06921 Sophia-Antipolis Cedex; France, [retrieved on Oct. 6, 2009] Section 2.

* cited by examiner

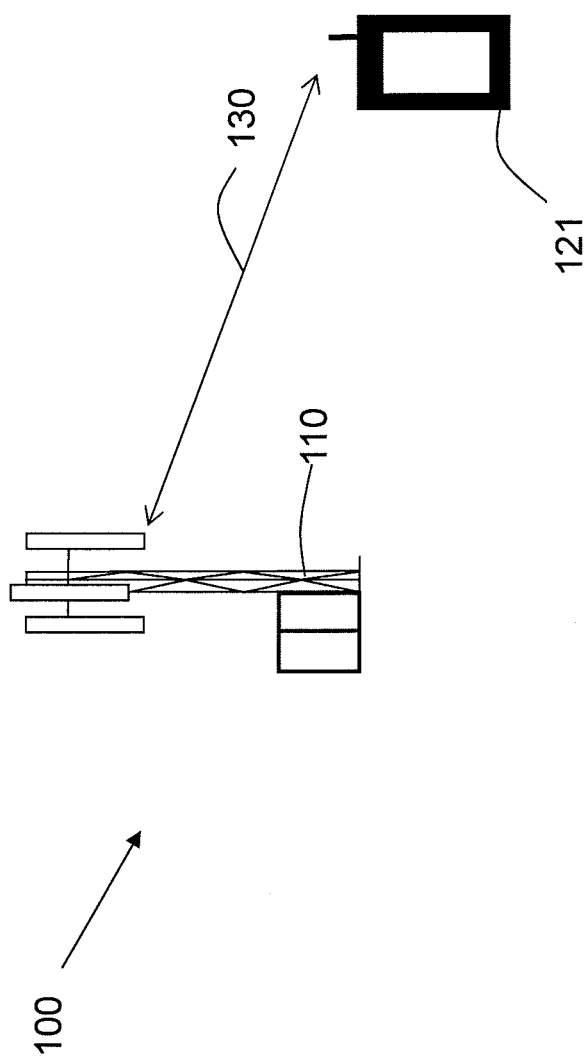

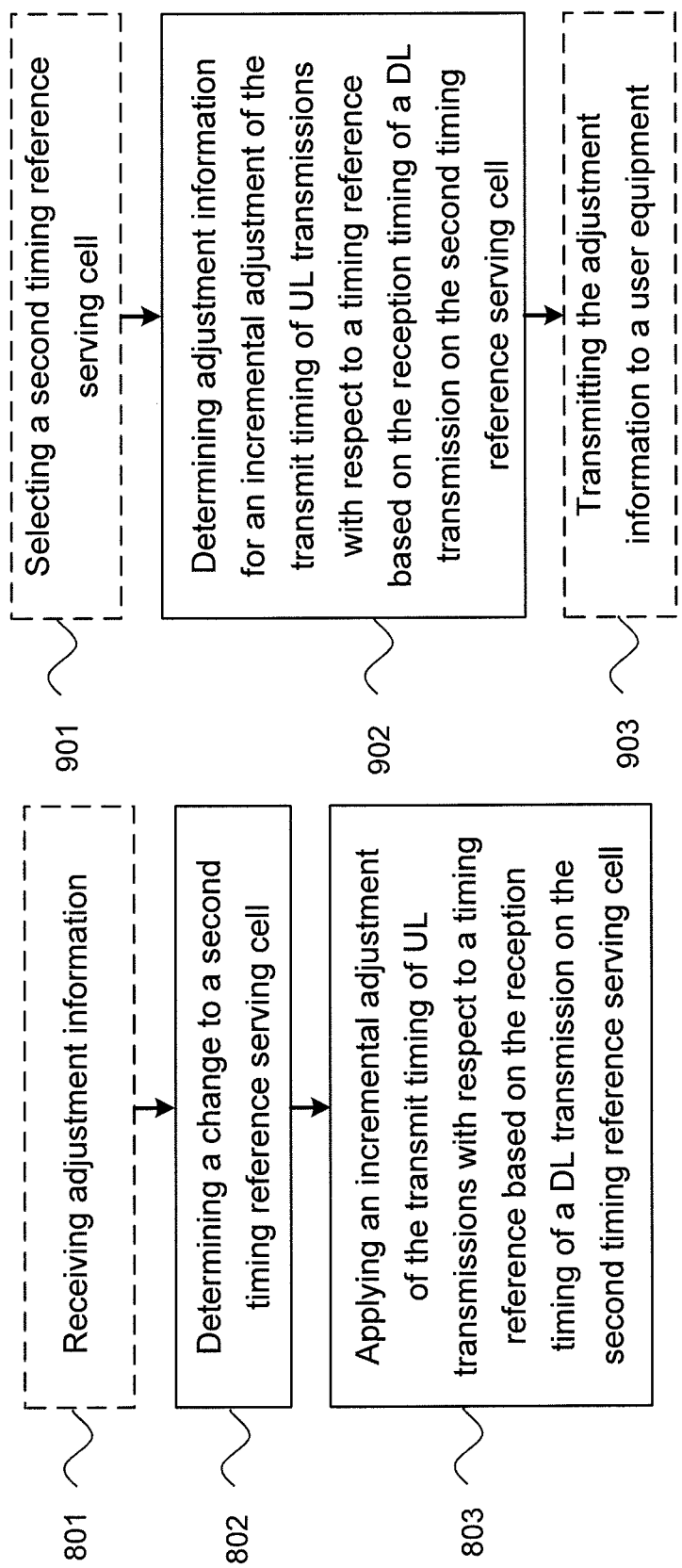

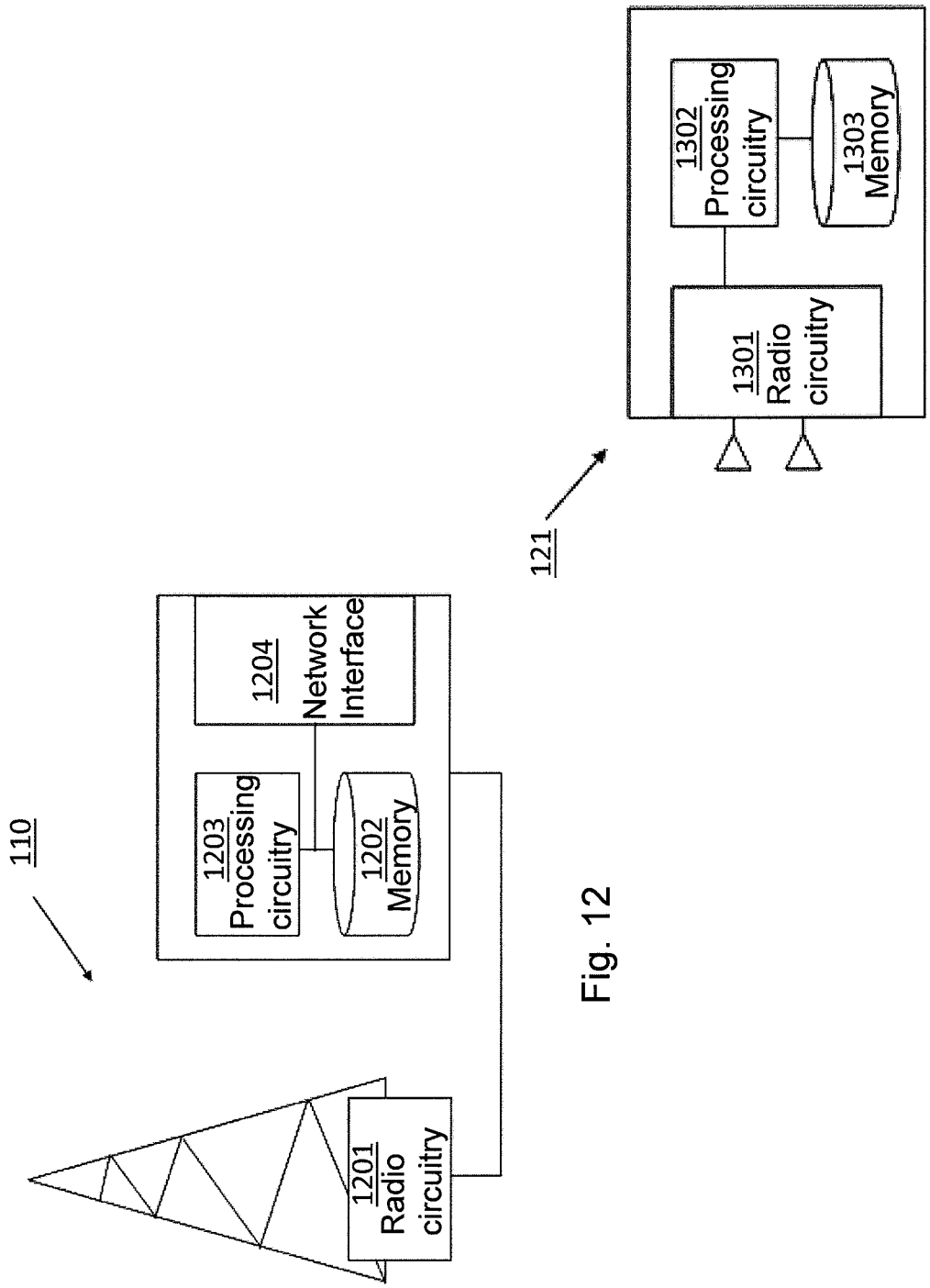

NETWORK NODE, USER EQUIPMENT AND METHODS THEREIN FOR ADJUSTING THE TRANSMIT TIMING OF UPLINK TRANSMISSIONS

TECHNICAL FIELD

Embodiments herein relate to a network node, a user equipment and methods therein. In particular, embodiments herein relate to adjusting the transmit timing of uplink transmissions in a telecommunications system.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

LTE is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE technology is a mobile broadband wireless communication technology in which transmissions are sent using orthogonal frequency division multiplexing (OFDM), wherein the transmissions are sent from base stations, also referred to herein as network nodes or eNBs, to mobile stations, also referred to herein as user equipments or UEs. The transmission OFDM splits the signal into multiple parallel sub-carriers in frequency.

A basic unit of transmission in LTE is a Resource Block (RB) which in its most common configuration comprises 12 subcarriers and 7 OFDM symbols in one time slot. A unit of one subcarrier and 1 OFDM symbol is referred to as a resource element (RE), as shown in FIG. 1. Thus, an RB comprises 84 REs.

Accordingly, a basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies for subcarriers having a subcarrier spacing Δf are defined along an z-axis and symbols are defined along an x-axis.

In the time domain, LTE downlink transmissions are organized into radio frames of 10 ms, each radio frame comprising ten equally-sized sub-frames, #0-#9, each with a $T_{sub-frame}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

An LTE radio sub-frame is composed of multiple RBs in frequency with the number of RBs determining the bandwidth of the system and two slots in time, as shown in FIG. 3. Furthermore, the two RBs in a sub-frame that are adjacent in time are denoted as an RB pair.

Downlink (DL) transmissions are dynamically scheduled, i.e. in each subframe the network node transmits control information about to which user equipments data is transmitted and upon which RBs the data is transmitted, in the current DL subframe. This control signalling is typically transmitted in the first 1, 2, 3 or 4 OFDM symbols in each subframe. The number n=1, 2, 3 or 4 is known as a Control Format Indicator, CFI. The DL subframe also comprises common reference symbols, CRS. The CRS are known to the receiver and used for coherent demodulation of e.g. the control information.

Carrier Aggregation

In LTE Release 10, a Component Carrier (CC) bandwidth of up to 20 MHz is supported. This is the maximal carrier bandwidth for the earlier LTE Release 8. Hence, an LTE Release 10 operation that is wider than 20 MHz is possible. To a UE of LTE Release 10, this may appear as a number of LTE carriers.

However, it may also be advantageous to assure that an efficient use of a wide carrier is also performed for legacy UEs, i.e. where legacy UEs may be scheduled in all parts of the wideband LTE Release 10 carrier. One way to do is by means of Carrier Aggregation (CA), as shown in FIG. 4.

In the LTE Release 10, up to 5 aggregated carriers is supported. Each carrier is limited in the Radio Frequency (RF) specifications to have one out of six bandwidths, namely, 6, 15, 25, 50, 75 or 100 RBs. These correspond to 1.4, 3, 5, 10, 15 and 20 MHz, respectively.

The number of aggregated CCs, as well as, the bandwidth of the individual CC may be different for UL and DL. A symmetric configuration refers to the case where the number of CCs in DL and UL are the same. An asymmetric configuration refers to the case where the number of CCs in DL and UL are different.

Note that the number of CCs configured in the network node may be different from the number of CCs as seen by a UE. For example, a UE may support more DL CCs than UL CCs, even though the network node offers the same number of UL CCs and DL CCs.

CCs may also be referred to as cells or serving cells. Particularly, in an LTE network, the CCs aggregated by a UE may be denoted Primary Cell (PCell) and Secondary Cells (SCells). The term "serving cell" may comprise both a PCell and SCells. The PCell is UE specific and may be viewed as "more important". That is because vital control signaling and other important signaling is typically handled via the PCell. The CC configured as the PCell is the primary CC, whereas all other CCs are secondary CCs.

During initial access a UE of LTE Release 10 acts similarly to a UE of LTE Release 8. For example, upon successful connection to the network a UE may, depending on its own capabilities and the networks capabilities, be configured with additional CCs in the UL and DL. This configuration may be based on Radio Resource Control (RRC) signalling.

Because of heavy signalling and rather slow speed of the RRC signalling, a UE may be configured with multiple CCs, even though not all of the CCs are currently being used. If a UE is activated on multiple CCs, it follows that the UE has to monitor all DL CCs, e.g. for a Physical Downlink Control Channel (PDCCH) and Physical Downlink Shared Channel (PDCCH). This implies a wider receiver bandwidth, higher sampling rates, etc. This will result in higher power consumption by the UE.

Timing Alignment of Signals Received at the Network Node

In order to preserve the orthogonality in UL, the UL transmissions from multiple UEs need to be time aligned at the network node. This means that the transmit timing of the UEs, which are under the control of the same network node, should be adjusted to ensure that their transmitted signals arrives at the network node at the same time. More specifically, well within the Cyclic Prefix (CP). CP may e.g. be seen as a guard interval for the symbols in the signals. This ensures that the network node is able to use the same resources, i.e. the same DFT or FFT resource, to receive and process the signals from multiple UEs.

As shown in FIG. 5, UEs may be located at different distances from the network node. In FIG. 5, the UE 522 is located closer to the network node 510 than the UE 521, Because the UE 521 and the UE 522 are located at different distances from the network node 510, the UE 521 and the UE 522 will need to initiate their UL transmissions at different times. A UE far from the network node 510, i.e. UE 521, needs to start transmission earlier than a UE close to the network node 510, i.e. UE 522. This may, for example, be handled by a Timing Advance (TA) of the UL transmission from different UEs. That is, a UE 521 may start its UL transmission before a nominal time given by the timing of the DL signal that was received by the UE 521.

The timing advance is further illustrated in FIG. 6. In FIG. 6, the UL timing advance is maintained by the network node 510 through timing alignment commands to the UE 521 and the UE 522 based on measurements on UL transmissions from the UE 521 and the UE 522, respectively. Through these timing alignment commands, the UE 521 and the UE 522 are respectively ordered to start their UL transmissions 530, 540 earlier or later, such that the UL transmissions 530, 540 from the UE 521 and the UE 522 are time aligned at the network node 510.

This applies to all UL transmissions except for random access preamble transmissions on Physical Random Access Control Channel (PRACH), i.e. including transmissions on the Physical Uplink Shared CHannel (PUSCH), Physical Uplink Control CHannel (PUCCH), and Sounding Reference Signal (SRS). There is a strict relation between DL transmissions and the corresponding UL transmissions. Examples of this are the timing between a Downlink Shared CHannel (DL-SCH) transmission on PDSCH to the Hybrid ARQ (HARQ) Acknowledgment/Non-Acknowledgment (ACK/NACK) feedback transmitted in UL, either on PUCCH or PUSCH, or the timing between an UL grant transmission on PDCCH to the Uplink Shared CHannel (UL-SCH) transmission on PUSCH.

By increasing the timing advance value for a UE, the UE processing time between the DL transmission and the corresponding UL transmission decreases. For this reason, an upper limit on the maximum timing advance has been defined by 3GPP in order to set a lower limit on the processing time available for a UE. For LTE networks, this value has been set to approximately 667 us. This corresponds to a cell range of around 100 km. Note also that the timing advance value may compensate for the round trip delay.

In LTE Release 10, there is only a single timing advance value per UE and all UL cells are assumed to have the same transmission timing. The reference point for the timing advance is the receive timing of the primary DL cell.

In LTE Release 11, different serving cells used by the same UE may have different timing advance values. In 3GPP, it is currently assumed that serving cells sharing the same timing advance value, e.g. depending on the deployment, will be configured by the network node to belong to a timing advance group, also referred to as a TA group.

It is further assumed that if at least one serving cell of the TA group is time aligned, all serving cells belonging to the same TA group may also use this TA value. Thus, for example, to obtain time alignment for an SCell belonging to a different TA group than the PCell, it is the current 3GPP assumption that initiated random access by the network node may be used to obtain an initial TA-value for this SCell; thus, also for the TA group which the SCell belongs to. The reference point for the TA has not been determined as of yet.

Timing Alignment of Signals Transmitted at the Network Node

There is a requirement on the network node to align the transmit timing of signals transmitted to the same UE by different transmitter ports or branches. This requirement applies to frame timing in transmit (TX) diversity transmissions, MIMO transmission, carrier aggregation and their combinations e.g. antennas involved MIMO transmission, carrier frequencies or cells involved in multi-carriers, CoMP, etc.

In general, for any specific set of transmitter configuration or transmission mode in the network node, the Time Alignment Error (TAE) is defined as the largest timing difference between any two transmitted signals. The purpose of the TAE requirement is to ensure that the UE received signals within a certain period of time. This namely reduces the processing and complexity in the UE. For example, in case of MIMO or TX diversity transmissions, at each carrier frequency, the TAE shall not exceed 65 ns. In another example, in case of intra-band contiguous carrier aggregation, with or without MIMO or TX diversity, the TAE shall not exceed 130 ns. For inter-band carrier aggregation, with or without MIMO or TX diversity, the TAE shall not exceed 1.3 µs. In a further example, in case of CoMP or carrier aggregation when the cells or carriers are physically located in different sites, the TAE may be much larger. Currently no such requirement exists.

SCell Activation and Deactivation

In LTE Release 10, Carrier Aggregation (CA) was introduced, and with this introduction, the concept of SCells. That is additional resources which could be configured or de-configured, and activated or de-activated on a per need basis. The activation or deactivation procedure is described in detail in section 5.13 of 3GPP TS 36.213 Medium Access Control (MAC) protocol specification.

Each SCell is configured with a Cell Index (CE), which may be denoted by SCellIndex. The SCellIndex is an identifier which is unique among all serving cells configured for this UE. The PCell will always have cell index that is 0, and a SCell may have a cell index that is an integer of 1 to 7, i.e. SCellIndex=1, . . . , 7.

One of the areas where MAC cell indexes are used is for activation and deactivation of SCells. In LTE Release 10, the activation or de-activation of MAC cell indexes is defined in section 6.1.3.8 of 3GPP TS 36.213 Medium Access Control (MAC) protocol specification. The activation or de-activation of MAC cell indexes comprises a single octet in turn comprising seven C-fields and one R-field. Each C-field corresponds to a specific SCellIndex. This indicates whether the specific SCell is activated or deactivated. The UE will ignore all C-fields that are associated with cell indexes that are not configured. The activation or de-activation of MAC cell indexes always indicates the activation status of all configured SCells. This means that if the network node wants to activate one SCell, the network node has to include all configured SCells and set them to activated or deactivated even if their status has not changed.

Initial TAC and Subsequent TAC

A timing advance value, i.e. TA value, is used by the UE to offset the UL transmission timing relative a timing reference.

For random access, the UE may assume an initial TA value of zero. The network node measures the time misalignment of the desired UL timing on this cell, and the actual UL timing of the preamble transmission. The network node then creates an initial TA command comprising information which tells the UE how much to advance the UL transmission.

After the random access is successfully completed, the UE will initiate UL transmission on cell i at a time $T_i$ before it receives the DL subframe starting on cell i. The time $T_i$ is deduced from the TA value for the cell i. When receiving these subsequent UL transmissions, the network node also measures the time misalignment of the desired UL timing for this cell and the actual UL timing from the UE on this cell. If measured time misalignment is exceeding a certain value, the network node creates a TA command comprising a delta update, i.e. a timing advance update, for the TA command which is sent to the UE.

In the current release, the initial TA value is an 11 bit long value and is sent in the random access response message. This TA value conveys to the UE how much the UL transmission on a cell should be advanced in relation to a timing reference. In LTE Release 10, this reference timing is the DL of the PCell. Subsequent TA values are updates of the current TA value. The subsequent TA values may be carried in a 6 bit long value and be sent in a MAC control element.

It should be noted that subsequent TA values may be delta updates of the current TA value. Hence, an initial TA value is needed for subsequent TA delta updates to be meaningful. This means that a random access is needed for subsequent TA commands to be meaningful.

In carrier aggregation, the UE may change the cell in a TA group that is used as a timing reference for adjustments of the UL transmit timing. This means that the transmit timing of the new cell to be used as the timing reference may be significantly different compared to that of the previous cell that was used as a timing reference. This change may lead to substantial performance degradation at the network node.

This means that because a change in the timing reference serving cell for a group of serving cells, i.e. TA group, may occur from one subframe to another, there may be an abrupt and significant change in the transmit timing of uplink transmissions on the group of serving cells. This is because the transmit timing of uplink transmissions on the group of serving cells is dependent upon the reference timing of the current timing reference serving cell.

In other words, a large difference between the reference timing of the new timing reference serving cell and the reference timing of the previous timing reference serving cell may cause a sudden and relatively large change in the transmit timing of the uplink transmissions on the group of serving cells. This sudden and relatively large change in the transmit timing may cause problems in the reception of the uplink transmission at the network node, since e.g. the receiver in the network node may not be able to follow such a change from one subframe to another, and consequently lead to performance degradation in the network node.

SUMMARY

It is an object of embodiments herein to prevent performance degradation in a network node.

According to a first aspect of embodiments herein, the object is achieved by a method in a user equipment for adjusting a transmit timing of uplink transmissions to a network node in a telecommunications system. The user equipment is configurable with more than one aggregated serving cells. The more than one aggregated serving cells are divided into one or more groups of serving cells based on a timing advance value of each of the aggregated serving cells. The one or more groups of serving cells each comprises a timing reference serving cell. The reception timing of a downlink transmission from a timing reference serving cell is used as a timing reference for the transmit timing of uplink transmissions for the serving cells in the group of serving cells comprising the timing reference serving cell, respectively. The user equipment determines a change to a second timing reference serving cell in a group of serving cells, which second timing reference serving cell is different from a first timing reference serving cell currently being used as the timing reference serving cell for the group of serving cells. The user equipment then applies an incremental adjustment of the transmit timing of uplink transmissions for the serving cells in the group of serving cells with respect to a timing reference based on the reception timing of a downlink transmission from the second timing reference serving cell in the user equipment.

According to a fourth aspect of embodiments herein, the object is achieved by a user equipment for adjusting a transmit timing of uplink transmissions to a network node in a telecommunications system. The user equipment is configurable with more than one aggregated serving cells. The more than one aggregated serving cells are divided into one or more groups of serving cells based on a timing advance value of each of the aggregated serving cells. The one or more groups of serving cells each comprises a timing reference serving cell. The reception timing of a downlink transmission from a timing reference serving cell is used as a timing reference for the transmit timing of uplink transmissions for the serving cells in the group of serving cells comprising the timing reference serving cell, respectively. The user equipment comprises a processing circuitry configured to determine a change to a second timing reference serving cell in a group of serving cells, which second timing reference serving cell is different from a first timing reference serving cell currently being used as the timing reference serving cell for the group of serving cells. The processing circuitry is further configured to apply an incremental adjustment of the transmit timing of uplink transmissions for the serving cells in the group of serving cells with respect to a timing reference based on the reception timing of a downlink transmission from the second timing reference serving cell in the user equipment.

According to a third aspect of embodiments herein, the object is achieved by a method in a network node for determining information for adjusting a transmit timing of uplink transmissions of a user equipment in a telecommunications system. The user equipment is configurable with more than one aggregated serving cells. The more than one aggregated serving cells are divided into one or more groups of serving cells based on a timing advance value of each of the aggregated serving cells. The one or more groups of serving cells each comprises a timing reference serving cell. The reception timing of a downlink transmission from a timing reference serving cell in the user equipment is used as a timing reference for the transmit timing of uplink transmissions to the network node for the serving cells in the group of serving cells comprising the timing reference serving cell, respectively. The network node selects a new timing reference serving cell for a group of serving cells comprising the user equipment. The network node then determine adjustment information for an incremental adjustment of the transmit timing of uplink transmissions for the serving cells in the group of serving cells with respect to a timing reference based on the reception timing of a downlink transmission from a second timing reference serving cell in the user equipment, which second timing reference serving cell is different from a first timing reference serving cell on which the timing reference is currently based.

According to a second aspect of embodiments herein, the object is achieved by a network node for determining information for adjusting the transmit timing of uplink transmissions of a user equipment in a telecommunications system. The user equipment is configurable with more than one aggregated serving cells. The more than one aggregated serving cells are divided into one or more groups of serving cells based on a timing advance value of each of the aggregated serving cells. The one or more groups of serving cells each comprises a timing reference serving cell. The reception timing of a downlink transmission from a timing reference serving cell in the user equipment is used as a timing reference for the transmit timing of uplink transmissions to the network node for the serving cells in the group of serving cells comprising the timing reference serving cell, respectively. The network node comprises a processing circuitry configured to select a new timing reference serving cell for a group of serving cells comprising the user equipment. The processing circuitry is further configured to determine adjustment information for an incremental adjustment of the transmit timing of uplink transmissions for the serving cells in the group of serving cells with respect to a timing reference based on the reception timing of a downlink transmission from a second timing reference serving cell in the user equipment, which second timing reference serving cell is different from a first timing reference serving cell on which the timing reference is currently based.

By determining a change to a new timing reference serving cell, i.e. the second timing reference serving cell, and applying an incremental adjustment of the transmit timing of uplink transmissions for the affected cells based on this new timing reference serving cell as described above, sudden and relatively large changes in the transmit timing of the uplink transmission is avoided.

Hence, by avoiding sudden and relatively large changes in the transmit timing, uplink transmission for the affected cells will be correctly received in the network node and thus ensuring that the performance of in the network node is not degraded.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 7 is a schematic block diagram illustrating embodiments in a telecommunications system, FIG. 8 is a flowchart depicting embodiments of a method in a user equipment, FIG. 9 is a flowchart depicting embodiments of a method in a network node, FIG. 12 is a schematic block diagram of embodiments of a network node, FIG. 13 is a schematic block diagram of embodiments of a user equipment.

DETAILED DESCRIPTION

Figure 1:
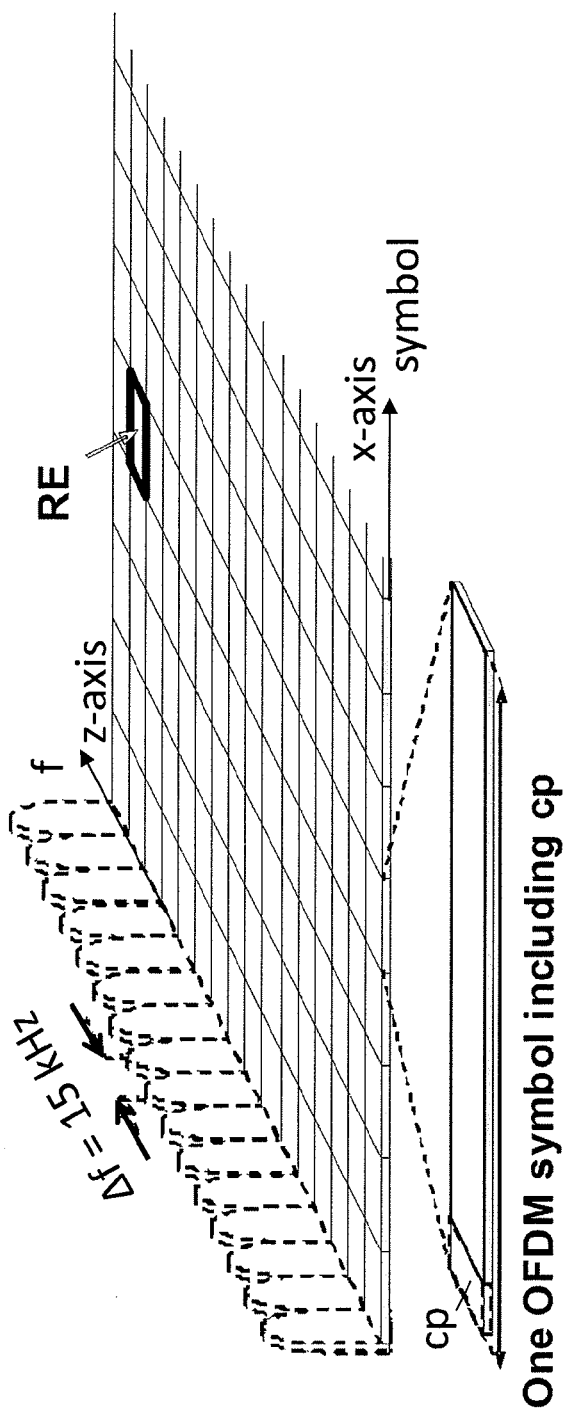
FIG. 1 is a schematic block diagram of a LTE downlink physical resource.
Figure 2:
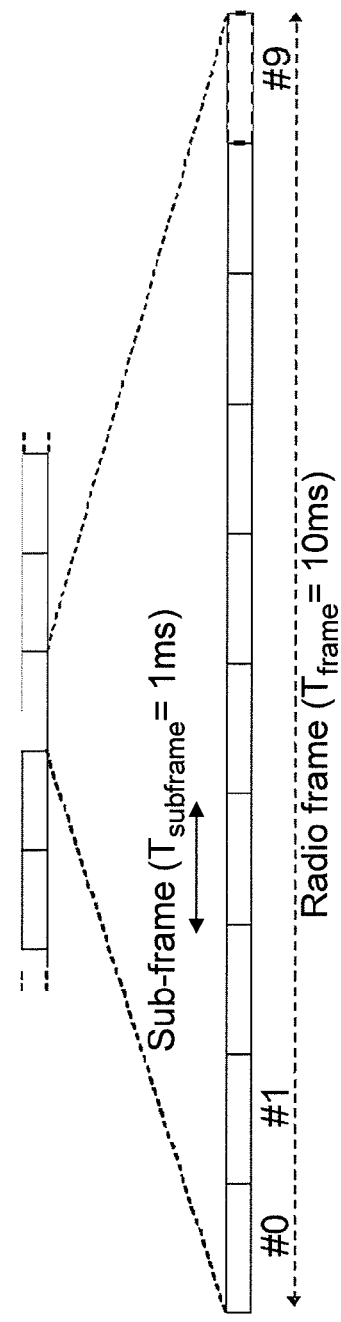
FIG. 2 is a schematic overview depicting radio frames.
Figure 3:
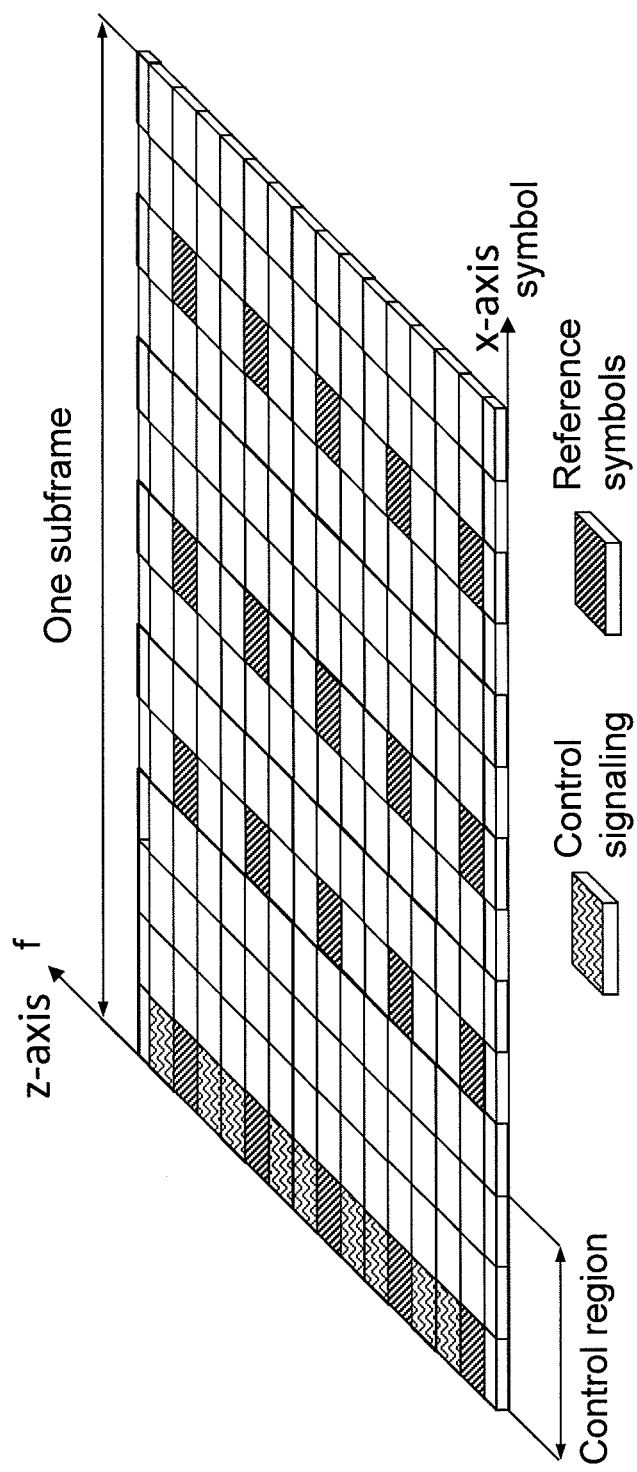
FIG. 3 is a schematic overview depicting a DL sub-frame.
Figure 4:
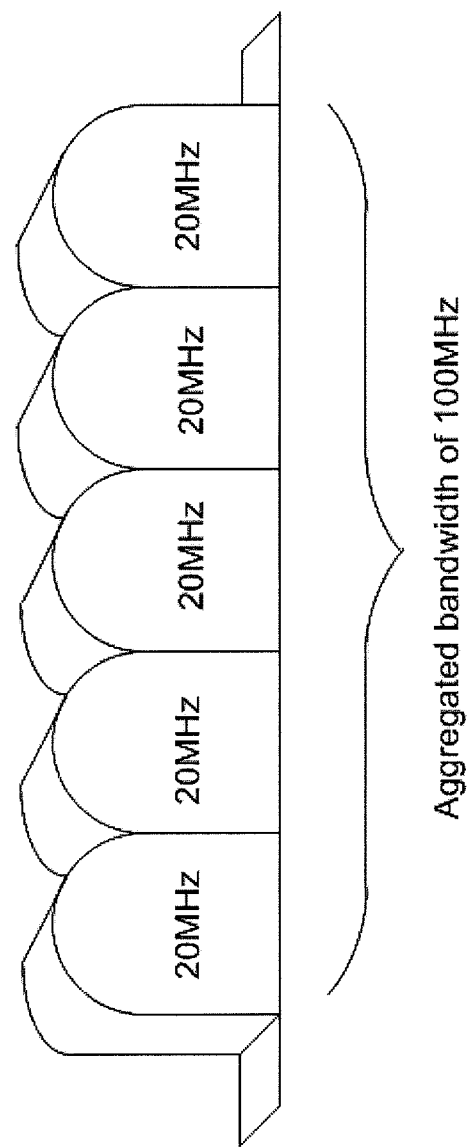
FIG. 4 is a schematic overview depicting carrier aggregation.
Figure 5:
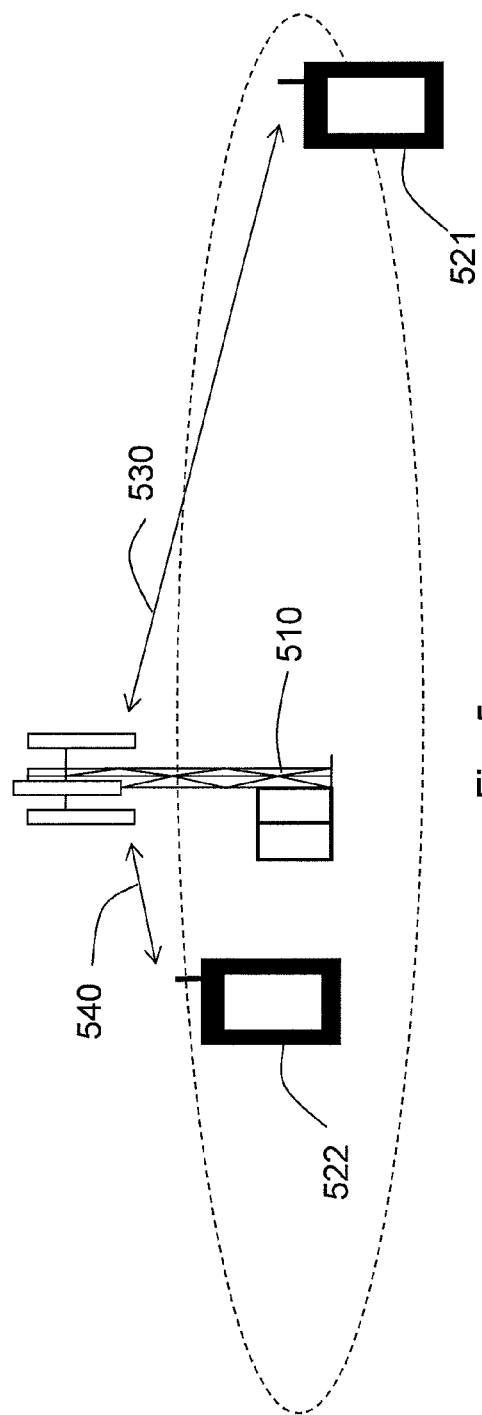
FIG. 5 is a schematic overview depicting user equipments located at different distances from a network node.
Figure 6:
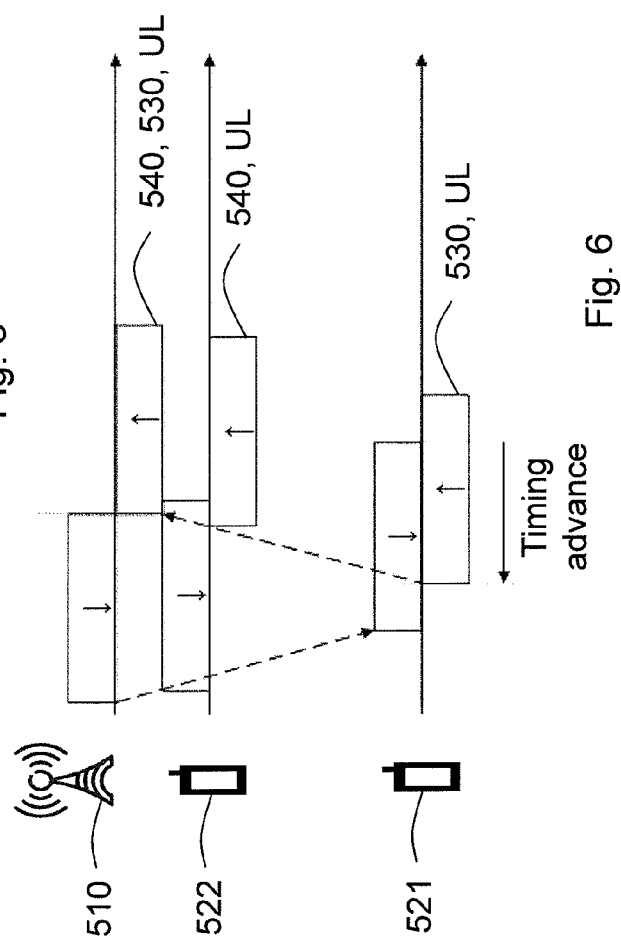
FIG. 6 is a schematic overview illustrating timing advance of uplink transmissions from user equipments located at different distances from a network node.

The figures are schematic and simplified for clarity, and they merely show details which are essential to the understanding of the embodiments, while other details have been left out. Throughout, the same reference numerals are used for identical or corresponding parts or steps.

As part of the developing the embodiments described herein, a problem will first be identified and discussed.

In some scenarios, it has been noted that no mechanism exists which defines how a user equipment should adjust its transmit timing of uplink transmissions for a group of serving cells, i.e. a TA group, autonomously when a change of the timing reference serving cell within the TA group has occurred. Thus, the user equipment is left with no other choice than to adjust its transmit timing of uplink transmissions for the TA group by following the reference timing of the new timing reference serving cell immediately after the change of the timing reference serving cell within the TA group has occurred.

In other words, since the downlink frame timing of the new timing reference serving cell in the TA group may be different than that of the downlink frame timing of the previous timing reference serving cell in the TA group, the straight forward solution is that the user equipment adjusts its uplink transmit timing immediately according to the downlink timing of the new timing reference serving cell.

For example, the difference in the transmit timing, e.g. the downlink frame timing, between the new timing reference serving cell and the previous timing reference serving cell may be as large as around 1.3 μs. However, for non co-located serving cells, i.e. serving cells which are located in different geographical sites, the difference in the downlink frame timing may even be larger.

Furthermore, the new timing reference serving cell may also have been recently activated and its transmit timing may not have fully stabilized. Hence, an overall difference in the transmit timing of different serving cells may momentarily become very large.

This may lead to substantial performance degradation at the receiver in the network node when there is a large difference between the reference timing of the new timing reference serving cell in a TA group compared to the previous timing reference serving cell, e.g. in the order of few μs. The performance degradation may, for example, be degradation in the demodulation of the signals transmitted by the user equipment.

It should also be noted that in some scenarios, there may also be an additional requirement on a user equipment to autonomously adjust the transmit timing of uplink transmission in a TA group in response to a drift in the transmit timing of the network node. The drift in the transmit timing of the network node may, for example, be caused by a sudden change in propagation conditions or variations in radio conditions, a drift due to imperfection in clocks, maintenance activities, or deliberate attempts by the network node to change the timing, etc.

Hence, since conventional user equipments are required to follow the change in the frame transmit timing of the timing reference serving cell, and correspondingly adjust the transmit timing of uplink transmission on the serving cells in the TA group for each transmission, the aggregated time misalignment between the reference timing of the new timing reference serving cell and the reference timing of the previous timing reference serving cell may momentarily become significantly large for this reason as well. This will further add to the performance degradation at the network node.

Therefore, under such circumstances, a need has been identified to define a mechanism which ensures that the user equipment does not perform any abrupt significant changes in the transmit timing of uplink transmissions for a TA group.

Therefore some of the exemplary embodiments presented herein are directed towards ways which prevents an abrupt change in a user equipments uplink transmit timing when the timing reference serving cell, i.e. the serving cell related to the timing reference, is changed. Instead, the user equipment changes its uplink timing gradually with a certain rate. This rate may also be referred to as a slew rate.

This change in the uplink transmit timing may imply an increase or a decrease in the uplink transmit timing. Therefore, the change of the uplink timing with a certain slew rate may be performed by the user equipment in either direction.

In other words, according to some of the exemplary embodiments presented herein, when a serving cell in a TA group used by the user equipment for the downlink timing reference (TR), i.e. a timing reference serving cell, is changed, the user equipment adjusts or changes its transmit timing for uplink transmissions for the TA group gradually, that is, applies incremental adjustments of the transmit timing.

In some embodiments, this gradual timing adjustment of the transmit timing of uplink transmissions for the TA group by the user equipment may be governed by a set of rules, by a set of network configurable parameters, or by a combination thereof. In some embodiments, the use of rules for the gradual timing adjustment may also depend upon one or more conditions, such as, e.g. signal quality of the timing reference serving cell, type of carrier aggregation, downlink timing difference between the new timing reference serving cell and old timing reference serving cells used for the timing reference, etc.

According to some embodiments, examples of the gradual timing adjustment may be summarized as being part of the following main principles: timing adjustment triggering based on pre-defined rules, timing adjustment triggering based on explicit request from network node, or timing adjustment triggering based on combination of explicit request and pre-defined rules. This is described in more detail by the embodiments shown and described in reference to FIGS. 7-13 below.

FIG. 7 depicts a telecommunications system 100 in which embodiments herein may be implemented. The cellular communications system 100 is a wireless communication network such as an LTE, WCDMA, GSM network, any 3GPP cellular network, or any cellular network or system.

The telecommunications system 100 comprises a base station, which is a network node and is therefore referred to herein as the network node 110. The network node 110 may in this example e.g. be an eNB, eNodeB, or a Home Node B, a Home eNode B, femto Base Station (BS), pico BS or any other network unit capable to serve a user equipment or a machine type communication device, such as e.g. the user equipment 121.

The user equipment 121 is configured to communicate within the telecommunications system 102 via the network node 110 over a radio link 130 when served by the network node 110. The user equipment 121 may, for example, be a mobile terminal or a wireless terminal, a mobile phone, a computer such as for example a laptop, a Personal Digital Assistant (PDA) or a tablet computer, sometimes referred to as a surf plate, with wireless capability, a device equipped with a wireless interface, such as a printer or a file storage device or any other radio network unit capable of communicating over a radio link in a telecommunications system.

Embodiments of a method in the user equipment 121 will now be described with reference to the flowchart depicted in FIG. 8. FIG. 8 is an illustrating example of a flow chart for a method in the user equipment 121 for adjusting the transmit timing of uplink transmissions of the user equipment 121 in the telecommunications system 100. The user equipment 121 is configurable with more than one aggregated serving cells, i.e. the user equipment 121 may be configured with more than one aggregated serving cells. The more than one aggregated serving cells are divided into one or more groups of serving cells, i.e. TA groups, based on the TA value of each of the aggregated serving cells. The one or more groups of serving cells, i.e. TA groups, each comprises a timing reference serving cell. As will be described in reference to FIGS. 10-11 below, the reception timing of a downlink transmission from a timing reference serving cell is used as a timing reference for a transmit timing of uplink transmissions for the serving cells in the group of serving cells, i.e. the TA group, comprising the timing reference serving cell, respectively.

FIG. 8 is an illustrating example of detailed exemplary actions or operations which may be taken by a user equipment 121. It should be appreciated that the flowchart diagram is provided merely as an example and that the user equipment 121 may be configured to perform any of the exemplary actions or operations provided herein. It should be appreciated that the actions or operations illustrated below are merely examples, thus it is not necessary for all the actions or operations to be performed. It should also be appreciated that the actions or operations may be performed in any combination. Furthermore, the flowchart in FIG. 8 comprises the following actions, and may be implemented for any of the above and below mentioned embodiments or in any combination with those.

Action 801

In some embodiments, the user equipment 121 may receive adjustment information from the network node 110. This may be performed in cases where it would be beneficial to have the network node 110 determine the adjustment of the transmit timing of uplink transmissions of the user equipment 121, e.g. as described below with reference to the embodiments of a network node 110 in FIG. 9.

In other words, the user equipment 121 may receive at least one parameter, e.g. from the network node 110, to be utilized in an incremental adjustment described in Action 803. This may imply that the user equipment 121 receives an adjustment request or an adjustment notification from the network node 110.

The adjustment information, e.g. the at least one parameter, may be e.g. a maximum magnitude in an uplink timing change per increment, a minimum aggregate uplink timing adjustment rate, or a maximum aggregate uplink timing adjustment rate. The at least one parameter may be comprised in the adjustment request or the adjustment notification. This means that the user equipment 121 may receive at least one parameter associated with the incremental adjustment. As described in Action 803, the user equipment 121 may utilize the at least one parameter in the applying of the incremental adjustment.

Action 802

In this action, the user equipment 121 determines a change to a second timing reference serving cell in a group of serving cells. The second timing reference serving cell is different from a first timing reference serving cell currently being used as the timing reference serving cell for the group of serving cells. The group of serving cells is the TA group of the user equipment 121. In other words, the user equipment 121 determines the presence of a new timing reference cell, i.e. the second timing reference serving cell.

In some embodiments, the user equipment 121 determine a change to the new timing reference serving cell by being informed by the network, e.g. the network node 110 or eNB, regarding the change of the timing reference serving cell. This information may be acquired by the user equipment 121 explicitly, e.g. by receiving an adjustment request or an adjustment notification from the network node 110 as described in the previous Action 801. This may be referred to as timing adjustment triggering based on an explicit request from network.

In some embodiments, the user equipment 121 determine a change to a new timing reference serving cell by being informed implicitly regarding the change of the timing reference serving cell, e.g. by receiving a triggering event. The triggering event may be based on at least one triggering rule in the user equipment 121. For example, the at least one triggering rule may be based on a timing threshold. Thus, the triggering event may be provided in the user equipment 121 when an adjustment in uplink timing in response to the new timing reference serving cell would cause a change that is greater to or equal to the timing threshold. This may also be referred to as timing adjustment triggering based on pre-defined rules.

This implicit mechanism, i.e. triggering rule, may e.g. be that a serving cell in TA group with certain characteristics may be considered as the timing reference serving cell for the TA group, or be determined by a change in the index or sequence numbers assigned to the serving cells in the TA group. In the latter, a cell with the lowest or the highest index in a TA group may, for example, be defined as the timing reference serving cell for the TA group. Such changes may also be explicitly made to the user equipment 121 by the network node 110.

Action 803

In this action, the user equipment 121 applies an incremental adjustment of the transmit timing of uplink transmissions for the serving cells in the group of serving cells. This is performed with respect to a timing reference based on the reception timing of a downlink transmission from the second timing reference serving cell in the user equipment 121. In other words, the user equipment 121 applies an incremental adjustment of the uplink transmission timing with respect to the new timing reference cell, i.e. the second timing reference serving cell.

This incremental or gradual adjustment to a new uplink transmit timing upon a change of the timing reference serving cell will give a smooth transition between the transmit timing of uplink transmissions of the previous timing reference serving cell, i.e. the first timing reference serving cell, and the transmit timing of uplink transmissions of the new timing reference serving cell, i.e. the second timing reference serving cell.

It should also be noted that applying this incremental adjustment may comprise applying an incremental advance or retreat of the uplink transmission timing. Also applying this incremental adjustment may comprise analyzing a total adjustment to be made with respect to a timing threshold, and determining a number of increments of the incremental adjustment based on this analysis. Further, applying this incremental adjustment may comprise choosing the new timing reference cell as an activated secondary cell with a lowest index value, and applying the incremental adjustment with respect to the activated secondary cell with the lowest index value.

According to some embodiments, the incremental adjustment, i.e. transmit timing adjustment, may be based on pre-defined rules or application rules.

The gradual change in the transmit timing of uplink transmissions, i.e. uplink timing, upon change of the timing reference serving cell may be performed by the user equipment 121 over a certain period of time. This means that it is performed with a certain rate or with a certain slew rate. The user equipment 121 may thus follow pre-defined increment steps over the certain period of time, i.e. a certain pre-defined time interval or slope. The maximum adjustment step may also be pre-defined.

More specifically, the pre-defined rules governing the adjustments of the transmit timing of uplink transmissions, i.e. the uplink timing adjustments, made by the user equipment 121 in response to the change of the serving cell in the TA group used as the timing reference serving cell may comprise:

T1—a maximum amount of the magnitude of the uplink timing change in one adjustment step;

T2—a minimum aggregate uplink timing adjustment rate over a certain period of time, or T3—a maximum aggregate uplink timing adjustment rate over a certain period of time.

In some embodiments, T1 may e.g. be 100 ns, T2 may e.g. be 300 ns per second, and T3 may e.g. be 1 µs per 200 ms. T1-T3 are parameters determining maximum or aggregated minimum or maximum adjustment steps over their respective time periods.

It should be noted that the magnitude of the incremental adjustment may be less than the magnitude of the difference between the reception timings of downlink reception transmissions of the previous timing reference serving cell and the new timing reference serving cell, when the magnitude of the difference is above a threshold.

Furthermore the above stated parameters of the predefined rules or application rules, i.e. T1-T3, may also depend upon one or more of the following factors:

- The bandwidth of the transmitted signals. For example, the downlink cell transmission bandwidth and/or the uplink cell transmission bandwidth. Another example, is if a previous and new timing reference serving cell belongs to different frequency bands, or if a previous and new timing reference serving cells are separated in the frequency domain by a predetermined margin, for example, non-contiguous carriers in the same band;
- The type of carrier aggregation (CA) scheme. For example, intra-band contiguous CA, intra-band non-contiguous CA, inter-band CA, etc.;
- A user equipment activity factor. For example, whether the user equipment 121 is in a Discontinuous Reception (DRX) state or a non-Discontinuous Reception state, or whether the user equipment 121 is in a Discontinuous Transmission (DTX) state or a non-Discontinuous Transmission state. If the user equipment 121 is in a DRX or in a DTX state, the user equipment activity factor may also be e.g. the DRX or DTX length, etc.;
- The type of physical channel. For example, an uplink data channel, such as, e.g. PUSCH, or an uplink control channel, such as, e.g. PUCCH, etc. Another example is if the user equipment 121 transmits a particular signal using a particular channel, such as, e.g. PUSCH, sounding reference signal, SRS, etc.;
- Whether or not the serving cells involved in CA or CoMP are co-located or not;
- A radio characteristic. For example, a user speed such as a user equipment speed above a predetermined threshold, a radio environment such as with a larger delay spread, a deployment scenario such as urban, etc. Another example is when the downlink signal quality of the new timing reference serving cell is poor, i.e. below threshold. This may be e.g. when one or more of SINR, RSRP, RSRQ, CSI, etc., are below their respective thresholds. A further example is when the user equipment 121 has not performed any measurement or any specific measurement, e.g. RSRP, on the new timing reference serving cell over the last T4 seconds. T4 may e.g. be 5 seconds. Yet a further example is when radio characteristics lead to a large drift in the downlink timing of new timing reference serving cell, e.g. when the delay spread is above a threshold, such as, e.g. 2 µs or more.

This means that the incremental adjustment may be applied based on at least one application rule, wherein the at least one application rule may provide for an adjustment amount for each incremental step of the adjustment.

This also means that the at least one application rule may be associated with, e.g. a bandwidth of transmitted signals, a type of carrier aggregation scheme, a user equipment activity factor, a type of physical channel, whether or not cells are co-located or not, or radio characteristics.

The at least one application rule may also be provided by the network node 110, e.g. in the receiving of adjustment information from the network node 110 as described in Action 801.

According to some embodiments, the gradual change of the uplink transmission timing, that is, the pre-defined rules that may be related to the uplink timing adjustments in response to change of the serving cell in a TA group, may e.g. be applied by the user equipment 121 if one or more of the following conditions are met.

One condition may be that the difference in the magnitude of the downlink reception timing between the new timing reference serving cell and the previous timing reference serving cell in a TA group is larger than a certain threshold D1. The threshold D1 may e.g. be more than 1 µs. This means that if the difference in the downlink reception timing of the new timing reference serving cell and the previous timing reference serving cell is smaller than the value of the threshold D1, the uplink transmission timing may be changed in a conventional way by simply following the downlink timing of the new timing reference serving cell.

This may be performed even for all the transmissions in the uplink. This means that the user equipment 121 may change the uplink transmission timing abruptly even in the first transmission to the network node 110. The threshold value D1 may be pre-defined in the user equipment 121, or be signalled by the network node 110 to the user equipment 121.

Another condition may be that a specific type of carrier aggregation is used. For example, that an inter-band carrier aggregation is used. A further condition may be that the new timing reference serving cell and the previous timing reference serving cell belong to different frequency bands or are separated in the frequency domain by a certain difference or margin, e.g. non-contiguous carriers in the same band). A further condition may also be that the particular radio characteristics lead to a large drift in downlink timing of the new timing reference serving cell, such as, e.g. when the delay spread is above a certain threshold, e.g. 2 µs or more.

A further condition may also be that the speed of the user equipment 121 is above a speed threshold, such as, e.g. over 90 km/hr. This is because a large fading dip, which may occur during high speeds of the user equipment 121, may lead to sudden changes in timing. A further condition may also be that the user equipment 121 transmits a particular signal or transmits using a particular channel, such as, e.g. PUSCH, SRS, etc.

Yet a further condition may be that the downlink signal quality of the new timing reference serving cell is poor, i.e. below certain threshold. For example, when one or more of SINR, RSRP, RSRQ, CSI, etc., is/are below respective thresholds. This is because the timing of the new timing reference serving cell may not be fully reliable, and therefore a gradual change in the uplink timing may be desirable. Yet a further condition may also be that the user equipment 121 has not performed any measurement, or any specific measurement, such as, e.g. RSRP, on the new timing reference serving cell over a particular time period. The particular time period may e.g. be the last T4 seconds, which may be e.g. 5 seconds.

Embodiments of a method in the network node 110 will now be described with reference to the flowchart depicted in FIG. 9. FIG. 9 is an illustrating example of a flow chart for a method in the network node 110 for determining information for adjusting the transmit timing of uplink transmissions of the user equipment 121 in the telecommunications system 100. The user equipment 121 is configurable with more than one aggregated serving cells. The more than one aggregated serving cells are divided into one or more groups of serving cells, i.e. TA groups, based on the TA value of each of the aggregated serving cells. The one or more groups of serving cells, i.e. TA groups, each comprises a timing reference serving cell. As described in reference to FIGS. 10-11 below, the reception timing of a downlink transmission from a timing reference serving cell is used as a timing reference for the transmit timing of uplink transmissions for the serving cells in the group of serving cells, i.e. TA group, comprising the timing reference serving cell, respectively.

FIG. 9 is an illustrating example of detailed exemplary actions or operations which may be taken by a network node 110. It should be appreciated that the flowchart diagram is provided merely as an example and that the network node 110 may be configured to perform any of the exemplary actions or operations provided herein. It should be appreciated that the actions or operations illustrated below are merely examples, thus it is not necessary for all the actions or operations to be performed. It should also be appreciated that the actions or operations may be performed in any combination. Furthermore, the flowchart in FIG. 9 comprises the following actions, and may be implemented for any of the above and below mentioned embodiments or in any combination with those.

Action 901

In some embodiments, the network node 110 may select a second timing reference serving cell. This means that the network node 110 may select the second timing reference serving cell as the timing reference serving cell for a group of serving cells, i.e. a TA group, comprised in the user equipment 121.

Action 902

In this action, the network node 110 determines adjustment information for an incremental adjustment of the transmit timing of uplink transmissions for the serving cells in the group of serving cells, i.e. the TA group, with respect to a timing reference based on the reception timing of a downlink transmission from a second timing reference serving cell in the user equipment 121. The second timing reference serving cell is different from a first timing reference serving cell on which the timing reference is currently based.

According to some embodiments, the adjustment information may be a request to apply an incremental adjustment of the uplink transmission timing or a notification that a new timing reference serving cell is being utilized. The incremental adjustment may be an advance or retreat of the uplink transmission timing. Also, the adjustment information may comprise a selected new timing reference serving cell. In some embodiments, the selected new timing reference serving cell may be an activated secondary cell with a lowest index value.

For example, according to some embodiments, the network node 110 may select a value of the threshold 131 as described above with reference to embodiments of the user equipment 121. The value of the threshold D1 may be based on one or more criteria that are related to the capability of the receiver in the network node 110, i.e. the base station receiver capability. For example, if the receiver in the network node 110 is a more robust receiver, then the network node 110 may select the value of the threshold D1 such that the user equipment 121 is allowed to apply a gradual change in the uplink transmission timing when the downlink timing difference between the new timing reference serving cell and the previous timing reference serving cell is larger. According to one example, this means that the value of the threshold D1 may e.g. be more than 2 μs for the downlink timing difference between the new timing reference serving cell, i.e. the second timing reference serving cell, and the previous timing reference serving cell, i.e. the first timing reference serving cell, instead of e.g. more than 1 μs for a less robust receiver in the network node 110.

If the value of the threshold D1 is pre-defined in the user equipment 121, the network node 110 may still configure the user equipment 121 when to use this pre-defined threshold D1.

As previously mentioned, according to some embodiments, the incremental adjustment, i.e. the transmit timing adjustment, may be based on an explicit request from the network node 110. According to some embodiments, this means that the network node 110 explicitly may indicate whether the user equipment 121 should gradually change its uplink transmission timing or not, when the timing reference serving cell in a TA group is changed.

The pre-defined rules described above with reference to embodiments of the user equipment 121 on how to change the uplink transmission timing may still apply. However, the parameter values may be configurable. For example, the network node 110 may configure the user equipment 121 with one or more parameters, such as, parameters that are associated with the gradual change in the uplink transmission timing. This may e.g. be the maximum amount of the magnitude of the uplink timing change in one adjustment step, the minimum aggregate uplink timing adjustment rate, the maximum aggregate uplink timing adjustment rate, etc. The parameters may e.g. be the parameters T1-T3 described above with reference to embodiments of the user equipment 121.

The network node 110 may also select the parameters depending upon certain radio characteristics, such as, e.g. cell bandwidth (BW), radio conditions, activity level, carrier aggregation type, robustness of the receiver used at the network node 110, etc. If the receiver at the network node 110 is a more robust receiver, then the network node 110 may receive and process received uplink signals with a larger change in uplink transmission timing over a shorter period of time. In summary, according to some embodiments, the parameters as described for the pre-defined rules, application rules and/or conditions above with reference to embodiments of the user equipment 121 may be configured by the network node 110. This advantageously provides for more flexibility in the telecommunications system 100.

According to some embodiments, the incremental adjustment, i.e. transmit timing adjustment, may be based on a combination of the explicit request from the network node 110 and the pre-defined rules as described above with reference to embodiments of the user equipment 121. According to some embodiments, this means that the rules and values of the associated parameters governing the gradual change in the uplink transmission timing may be pre-defined, as described above with reference to embodiments of the user equipment 121.

However, the network node 110 may also explicitly indicate whether the user equipment 121 should apply the rules and values related to the gradual change in the uplink transmission timing, when the timing reference serving cell in a TA group has changed. In this case, the user equipment 121 may change the uplink transmission timing gradually only if the network node 110 indicates this explicitly. The network node 110 may also indicate the condition under which the user equipment 121 should apply the pre-defined rules. For example, the network node 110 may indicate that the user equipment 121 should apply the rules only if its speed is above a particular threshold.

Action 903

According to some embodiments, the network node 110 may, in this optional action, transmit the adjustment information to the user equipment 121. The transmitting may be performed based on triggering rules. The triggering rule(s) may be based on a timing threshold.

If the user equipment 121 changes its uplink transmission timing too fast when the timing reference serving cell in a TA group is changed, the receiver at the network node 110 may not be able to handle the reception of the signals from the user equipment 121. This will degrade the uplink performance of the network node 110 and e.g. result in a loss in uplink system throughput.

The embodiments described herein avoid these problems relating to the change in the timing reference serving cells with different downlink reception timing. The behaviour of the user equipment 121 with respect to the rate of the change of the uplink transmission timing is defined. This ensures consistency in the behaviour of the user equipment 121.

Figure 10:
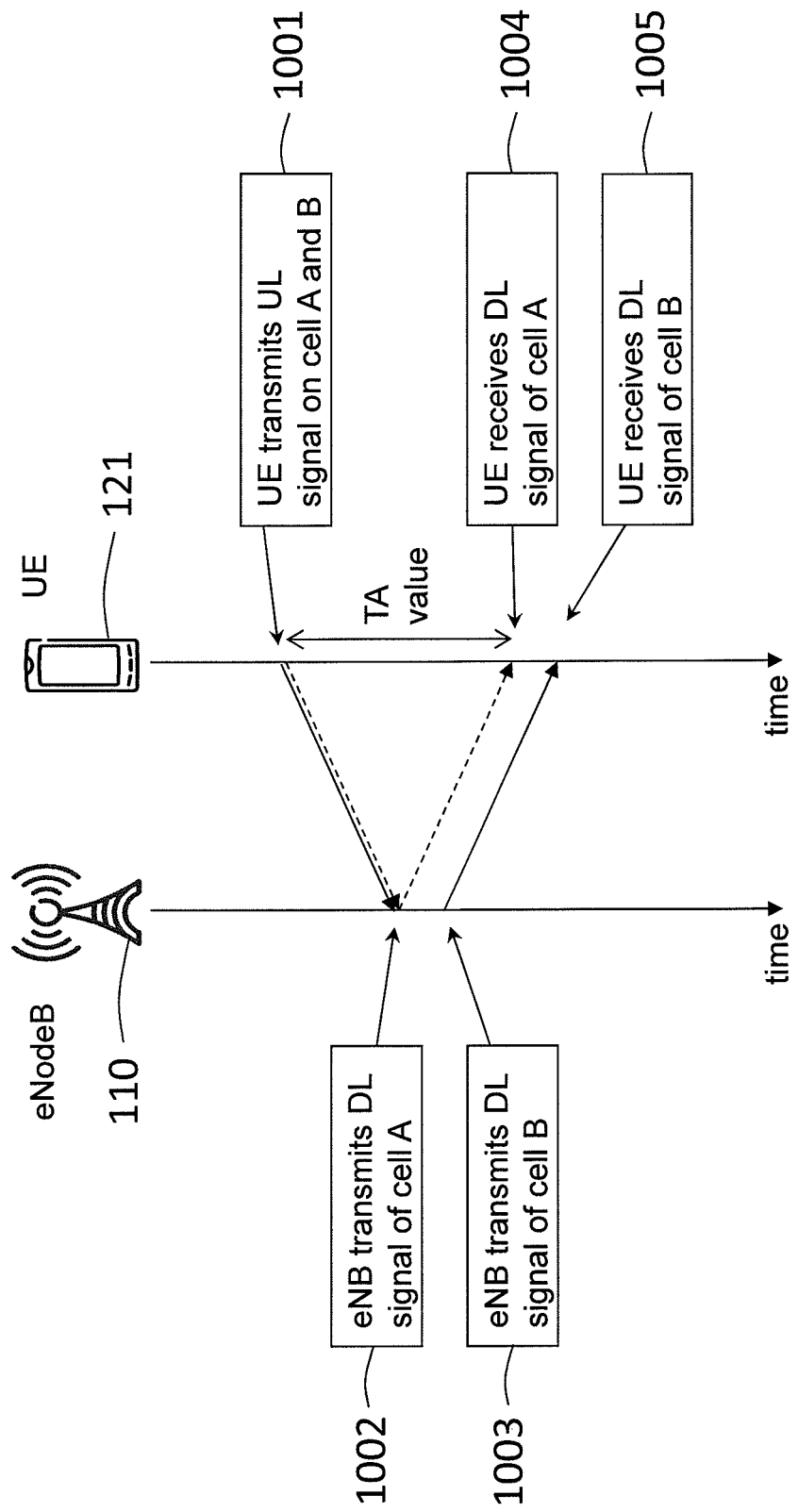
FIG. 10 is a signalling diagram illustrating exemplary timing advance using a timing reference serving cell.

FIG. 10 depicts a signalling diagram between the network node 110 and the user equipment 121 illustrating an exemplary timing advance using a timing reference serving cell.

As previously described, with the introduction of TA grouping in the LTE Release 11, it is possible to group the serving cells of a user equipments 121 into TA groups depending on the TA values of the serving cells. Thus, the user equipment 121 supports more than one aggregated serving cells. The more than one aggregated serving cells are divided into one or more groups of serving cells, i.e. TA group(s), based on the TA value of each of the aggregated serving cells.

Each TA group may have an associated TA timer. The TA timer may control the validity of a defined TA value. This means that as long as the TA timer is running, the defined TA value is considered valid. If the defined TA value is valid, the user equipment 121 is considered synchronized for uplink transmissions on the serving cells associated with the defined TA value, i.e. the serving cells belonging to the TA group. The TA timer will be restarted upon reception of a TA command which updates the TA value. If no TA command is received for a certain period of time, the TA timer may expire. However, the TA timer may also be set to infinity, in which case the TA timer will not expire.

In each TA group, there will be one serving cell defined as the timing reference serving cell. This means that the one or more groups of serving cells, supported by the user equipment 121, each comprises a timing reference serving cell. The uplink transmission timing on the serving cells in a TA group will be in relation to the downlink reception timing on the timing reference serving cell. This means that the reception timing of a downlink transmission on a timing reference serving cell is used as a timing reference for the transmit timing of uplink transmissions on the cells in the group of serving cells comprising the timing reference serving cell, respectively.

The uplink transmission timing in a TA group may be the downlink reception timing of the timing reference serving cell in that TA group minus the TA value for this TA group. This means that the transmit timing of uplink transmissions for the serving cells in the group of serving cells comprising the timing reference serving cell is determined as the reception timing of a downlink transmission from the timing reference serving cell minus the TA value of the group of serving cells comprising the timing reference serving cell.

The signalling diagram in FIG. 10 may comprise the following actions, and may be implemented for any of the below mentioned embodiments or in any combination with those. Note that an overview of the signalling diagram is illustrated in FIG. 10, and that all the actions performed may not be shown in order to simplify.

Action 1001

In this action, the user equipment 121 transmits an uplink signal on a serving cell A and a serving cell B. The user equipment 121 is configured with the two serving cells A and B. The serving cells A and B are placed in the same TA group, wherein the serving cell A is the timing reference serving cell for this TA group. Hence, the serving cells A and B share the same timing reference and TA value. In other words, the timing reference for the serving cells A and B is based on the reception timing of downlink transmissions on the timing reference serving cell of the TA group to which the serving cells A and B belongs, i.e. the reception timing of downlink transmissions on the serving cell A. This means that the TA value for the serving cells A and B is the defined TA value associated with the TA group to which the serving cells A and B belong.

Therefore, the user equipment 121 will have the same uplink transmission timing for these two cells. This means that the transmit timing of the uplink transmissions on the serving cells A and B will be the same, as indicated by the fully drawn and dashed arrows in the signalling diagram in FIG. 10.

Actions 1002-1003

It should be noted that exemplary requirements for the downlink time alignment of two serving cells may be 130 ns for serving cells in the same frequency band, 260 ns for non-contiguous serving cells in the same frequency band, and 1.3 µs for serving cells in difference frequency bands. This illustrates that the transmit timing of the downlink transmissions may not be assumed to be the identical for the serving cells A and B, but that there may be some time difference.

Thus, in these actions and as an example, the network node 110 first transmit a downlink signal on the serving cell A and later transmit a downlink signal on the serving cell B, as indicated by the fully drawn and dashed arrows in the signalling diagram in FIG. 10.

Actions 1004-1005

In these actions, the user equipment 121 receives the downlink signal on the serving cell A and the downlink signal on the serving cell B time shifted. The user equipment 121 then applies the TA value to the downlink reception timing of the timing reference serving cell, i.e. the serving cell A, in order to calculate the transmit timing for uplink transmissions on the serving cells in the TA group, i.e. the serving cells A and B. The user equipment 121 may then transmit uplink signals on both the serving cell A and the serving cell B at that calculated time.

Figure 11:
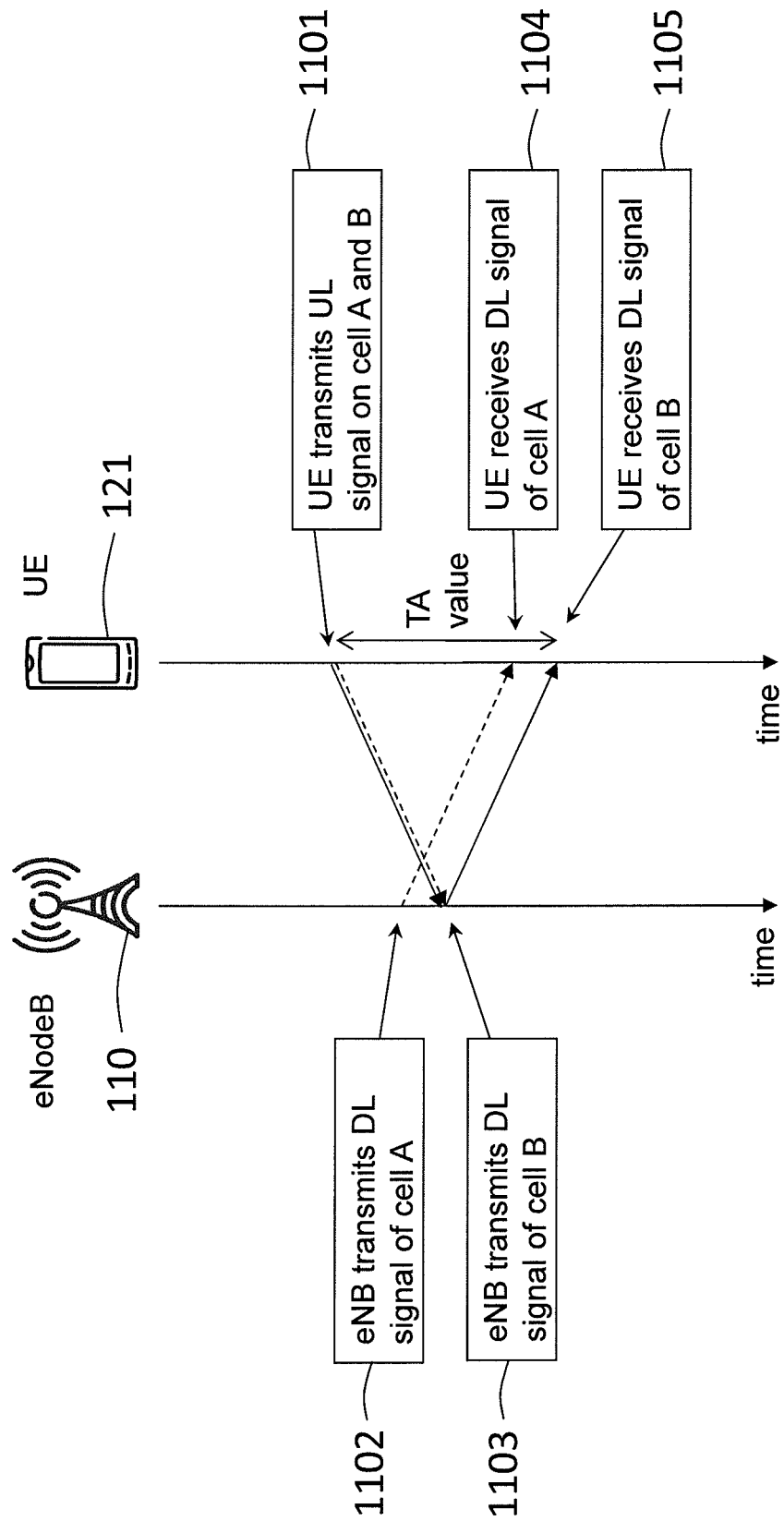
FIG. 11 is a signalling diagram illustrating exemplary timing advance using another timing reference serving cell.

FIG. 11 depicts a signalling diagram between the network node 110 and the user equipment 121 illustrating an exemplary timing advance using another timing reference serving cell than in FIG. 10. The signalling diagram in FIG. 11 may comprise the following actions, and may be implemented for any of the below mentioned embodiments or in any combination with those. Note that an overview of the signalling diagram is illustrated in FIG. 11, and that all the steps performed may not be shown in order to simplify.

Action 1101

In this action, the user equipment 121 transmits an uplink signal on a serving cell A and a serving cell B. The user equipment 121 is configured with the two serving cells A and B. The serving cells A and B are placed in the same TA group, wherein the serving cell B is the timing reference serving cell for this TA group. Hence, the serving cells A and B share the same timing reference and TA value. In other words, the timing reference for the serving cells A and B is based on the reception timing of downlink transmissions on the timing reference serving cell of the TA group to which the serving cells A and B belongs, i.e. the reception timing of downlink transmissions on the serving cell B. This means that the TA value for the serving cells A and B is the defined TA value associated with the TA group to which the serving cells A and B belong.

Therefore, the user equipment 121 will have the same uplink transmission timing for these two cells. This means that the transmit timing of the uplink transmissions on the serving cells A and B will be the same, as indicated by the fully drawn and dashed arrows in the signalling diagram in FIG. 11.

Actions 1102-1103

In these actions and as an example, the network node 110 may first transmit a downlink signal on the serving cell A and later transmit a downlink signal on the serving cell B, as indicated by the fully drawn and dashed arrows in the signalling diagram in FIG. 11.

Actions 1104-1105

In these actions, the user equipment 121 receives the downlink signal on the serving cell A and the downlink signal on the serving cell B time shifted. The user equipment 121 then applies the TA value to the downlink reception timing of the timing reference serving cell, i.e. the serving cell B, in order to calculate the transmit timing for uplink transmissions on the serving cells in the TA group, i.e. the serving cells A and B. The user equipment 121 may then transmit uplink signals on both the serving cell A and the serving cell B at that calculated time.

It is currently not determined in any standard how to select the timing reference serving cell in a TA group, i.e. how to select the serving cell which should act as the timing reference serving cell in a TA group. According some examples, the selection of the timing reference serving cell may change from one subframe to another. The change of the timing reference serving cell for a user equipment 121 may occur, for example, by selecting a new timing reference serving cell or in that the serving cell acting as the timing reference serving cell is deactivated. According to other examples, the change of the timing reference serving cell for a user equipment 121 may occur in that the current timing reference serving cell is moved to another TA group, or in that the cell indexes of the serving cells configured for the user equipment 121 is changed, etc. Because the transmit timing of uplink transmission on the cells in a TA group is in relation to the timing reference serving cell of that TA group, changing the serving cell acting as the timing reference serving cell will also mean that the transmit timing of uplink transmissions is changed.

The uplink transmission timing is, as described, depending on the downlink transmission timing of the timing reference serving cell. This means that the transmit timing of uplink transmissions on the serving cells in a TA group depends on the reception timing of downlink transmissions on the timing reference serving cell, and may be seen by studying the transmit timing of the uplink transmissions in the FIGS. 10-11.

In FIG. 10, the user equipment 121 is transmitting in uplink on the serving cells A and B earlier than the user equipment 121 in FIG. 11. It may thus be readily seen that changing the timing reference serving cell for the TA group from being the serving cell A to being the serving cell B, or vice versa, will cause the user equipment 121 to advance, or retreat, the transmit timing of uplink transmission on the serving cells in the TA group, respectively.

The example embodiments presented herein may be utilized in a radio network, which may further comprise network nodes, such as, a base station 110, as illustrated in FIG. 12. The radio network may also comprise a user equipment 121, as illustrated in 13. It should be appreciated that the examples provided in FIGS. 12 and 13 are shown merely as non-limiting examples. According to the example embodiments, the network node 110 and user equipment 121 may be any other node as described in the examples provided in the above sections.

As shown in FIG. 12, the example network node 110 may comprise processing circuitry 1203, a memory 1202, radio circuitry 1201, and at least one antenna. The processing circuitry 1203 may comprise RF circuitry and baseband processing circuitry (not shown). In particular embodiments, some or all of the functionality described above as being provided by a mobile base station, a base station controller, a relay node, a NodeB, an enhanced NodeB, positioning node, and/or any other type of mobile communications node may be provided by the processing circuitry 1203 executing instructions stored on a computer-readable medium, such as the memory 1202 shown in FIG. 12. Alternative embodiments of the network node 110 may comprise additional components responsible for providing additional functionality, comprising any of the functionality identified above and/or any functionality necessary to support the solution described above. In other example embodiments, a network node may be not equipped with a radio interface or radio circuitry 1201.

It should also be appreciated that the processing circuitry, or any other hardware and/or software unit configured to execute operations and/or commands, of the network node 110 illustrated in FIG. 12 may be configured to configure to provide assistance, information and/or a command for a gradual UL timing adjustment in the presence of a serving cell TR change.

An example of a user equipment 121 is provided in FIG. 13. The example user equipment 121 may comprise processing circuitry 1302, a memory 1303, radio circuitry 1301, and at least one antenna. The radio circuitry 1301 may comprise RF circuitry and baseband processing circuitry (not shown). In particular embodiments, some or all of the functionality described above as being provided by mobile communication devices or other forms of wireless device may be provided by the processing circuitry 1302 executing instructions stored on a computer-readable medium, such as the memory 1303 shown in FIG. 13. Alternative embodiments of the user equipment 121 may comprise additional components responsible for providing additional functionality, comprising any of the functionality identified above and/or any functionality necessary to support the solution described above.

It should be appreciated that the processing circuitry, or any other hardware and/or software unit configured to execute operations and/or commands, of the user equipment 121 may be configured to determine a change to a new timing reference serving cell. The user equipment may be further configured to provide a gradual UL timing adjustment in the presence of a timing reference (TR) serving cell change.

To perform the method actions for determining information for adjusting the transmit timing of uplink transmissions of a user equipment 121, the network node 110 comprises the following arrangement depicted in FIG. 12. FIG. 12 shows a schematic block diagram of embodiments of the network node 110.

The user equipment 121 is configurable with more than one aggregated serving cells. The more than one aggregated serving cells are divided into one or more groups of serving cells based on a timing advance value of each of the aggregated serving cells. The one or more groups of serving cells each comprises a timing reference serving cell. The reception timing of a downlink transmission from a timing reference serving cell in the user equipment is used as a timing reference for the transmit timing of uplink transmissions to the network node for the serving cells in the group of serving cells comprising the timing reference serving cell, respectively.

The network node 110 comprises a processing circuitry 1203 configured to determine adjustment information for an incremental adjustment of the transmit timing of uplink transmissions for the serving cells in the group of serving cells with respect to a timing reference based on the reception timing of a downlink transmission from a second timing reference serving cell in the user equipment 121, which second timing reference serving cell is different from a first timing reference serving cell on which the timing reference is currently based.

The processing circuitry 1203 may further be configured to select the second timing reference serving cell as the timing reference serving cell for the group of serving cells comprised in the user equipment 121.

The network node 110 may comprise a radio circuitry 1201. The radio circuitry 1201 may be configured to transmit the adjustment information to the user equipment 121. The adjustment information may be a request to apply an incremental adjustment of uplink transmission timing or a notification that a new timing reference serving cell is being utilized.

Also, the radio circuitry 1201 may further be configured to transmit the adjustment information based on triggering rules. The at least one triggering rule may be based on a timing threshold. The incremental adjustment may be an advance or retreat of the uplink transmission timing.

According to some embodiments, the adjustment information may comprise a selected new timing reference serving cell. The selected new timing reference serving cell may, e.g. be an activated secondary cell with a lowest index value.

To perform the method actions for adjusting a transmit timing of uplink transmissions to a network node 110, the user equipment 121 comprises the following arrangement depicted in FIG. 13. FIG. 13 shows a schematic block diagram of embodiments of the user equipment 121.

The user equipment 121 is configurable with more than one aggregated serving cells. The more than one aggregated serving cells are divided into one or more groups of serving cells based on a timing advance value of each of the aggregated serving cells. The one or more groups of serving cells each comprises a timing reference serving cell. The reception timing of a downlink transmission from a timing reference serving cell is used as a timing reference for the transmit timing of uplink transmissions for the serving cells in the group of serving cells comprising the timing reference serving cell, respectively.

The user equipment 121 comprises a processing circuitry 1302 configured to determine a change to a second timing reference serving cell in a group of serving cells. The second timing reference serving cell is different from a first timing reference serving cell currently being used as the timing reference serving cell for the group of serving cells. The processing circuitry 1302 is further configured to apply an incremental adjustment of the transmit timing of uplink transmissions for the serving cells in the group of serving cells with respect to a timing reference based on the reception timing of a downlink transmission from the second timing reference serving cell in the user equipment (121).

The processing circuitry 1302 may further be configured to receive an adjustment request or an adjustment notification from the network node 110. Also, the processing circuitry 1302 may further be configured to receive a triggering event based on at least one triggering rule. The at least one triggering rule may be based on a timing threshold, and wherein the triggering event is provided when an adjustment in uplink transmission timing in response to the new timing reference serving cell would cause a change that is greater to or equal to the timing threshold. Further, the processing circuitry 1302 may further be configured to apply an incremental advance or retreat of the uplink transmission timing.

Also the processing circuitry 1302 may further be configured to apply the incremental adjustment based on at least one application rule. The at least one application rule may provide an adjustment amount for each incremental step of the adjustment. The at least one application rule may, for example, be associated with a bandwidth of transmitted signals, a type of carrier aggregation scheme, a user equipment activity factor, a type of physical channel, whether or not cells are co-located or not, radio characteristics, etc. The application rules may be provided by the network node 110.

According to some embodiments, the processing circuitry 1302 may further be configured to analyze a total adjustment to be made with respect to a timing threshold and the processing circuitry 1302 may also be configured to determine a number of increments of the incremental adjustment based on the analysis. According to some embodiments, the processing circuitry 1302 may further be configured to choose the new timing reference cell as an activated secondary cell with a lowest index value and applying the incremental adjustment with respect to the activated secondary cell with the lowest index value.

The user equipment 121 may further comprise radio circuitry 1301 configured to receive at least one parameter associated with the incremental adjustment. The processing circuitry 1302 may be configured to utilize the at least one parameter in the application of the incremental adjustment. The at least one parameter may be a maximum amount of magnitude in an uplink timing change per increment, a minimum aggregate uplink timing adjustment rate, and/or a maximum aggregate uplink timing adjustment rate.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

Although the description is mainly given for a user equipment, as measuring or recording unit, it should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations
3GPP 3$^{rd}$ Generation Partnership Project
ACK Acknowledgment
AL Aggregation Layer
ARQ Automatic Repeat Request
CA Carrier Aggregation
CC Component Carrier
CCE Control Channel Elements
CFI Control Format Indicator
CRC Cyclic Redundancy Check
C-RNTI Cell-Radio Network Temporary Identifier
DFT Discrete Fourier Transform
DL Downlink
eNB Evolved Node B
GSM/EDGE Global System for Mobile communications/Enhanced Data rate for GSM Evolution
HARQ Hybrid ARQ
LTE Long Term Evolution
NACK Non-Acknowledgment
OFDM Orthogonal Frequency-Division Multiplexing
PCC Primary component carrier
PCell Primary cell
PDCCH Physical Downlink Control Channel
PDSCH Physical Downlink Shared Channel
PRACH Physical Random Access Control Channel
PRB Physical Resource Block
PUCCH Physical Uplink Control CHannel
PUSCH Physical Uplink Shared CHannel
RACH Random Access Control Channel
RA Random Access
RA-RNTI Random Access-Radio Network Temporary Identifier
RB Resource Block
RAN Radio Access Network
RF Radio Frequency
RNTI Radio Network Temporary Identifier(s)
RRC Radio Resource Control
SCC Secondary Component Carrier
SCell Secondary cell
SRS Sounding Reference Signal
TA Timing Advance
TR Timing Reference
TC-RNTI Temporary Cell-Radio Network Temporary Identifier
UE User Equipment
UL Uplink
UMB Ultra Mobile Broadband
VRB Virtual Resource Block
WCDMA Wideband Code Division Multiple Access
WiMax Worldwide interoperability for Microwave Access

The invention claimed is:

1. A method in a user equipment for adjusting a transmit timing of uplink transmissions to a network node in a telecommunications system, the user equipment configurable with more than one aggregated serving cells that are divided into one or more groups of serving cells based on a timing advance value of each of the aggregated serving cells, the one or more groups of serving cells each comprising a timing reference serving cell, wherein reception timing of a downlink transmission from a timing reference serving cell is used as a timing reference for the transmit timing of uplink transmissions for the serving cells in the group of serving cells comprising the timing reference serving cell, respectively, the method comprising:

determining a change to a second timing reference serving cell in a group of serving cells, the second timing reference serving cell being different from a first timing reference serving cell currently being used as the timing reference serving cell for the group of serving cells; and applying an incremental adjustment of transmit timing of uplink transmissions for the serving cells in the group of serving cells with respect to a timing reference, the incremental adjustment based on reception timing of a downlink transmission from the second timing reference serving cell at the user equipment, wherein the incremental adjustment comprises two or more adjustments gradually applied in the incremental adjustment.

2. The method of claim 1 further comprising receiving an adjustment request or an adjustment notification from the network node.

3. The method of claim 1 wherein, in response to a magnitude of a difference between reception timings of downlink reception transmissions of the first timing reference serving cell and the second timing reference serving cell being above a threshold, a magnitude of the incremental adjustment is less than the magnitude of a difference between the reception timings of downlink reception transmissions of the first timing reference serving cell and the second timing reference serving cell.

4. The method of claim 1 wherein the determining comprises receiving a triggering event based on at least one triggering rule.

5. The method of claim 4:
wherein the at least one triggering rule is based on a timing threshold;
wherein the triggering event is provided when an adjustment in uplink transmission timing in response to the second timing reference serving cell would cause a change that is greater to or equal to the timing threshold.

6. The method of claim 1 wherein the applying comprises applying an incremental advance or retreat of the uplink transmission timing.

7. The method of claim 1 wherein the applying comprises:
analyzing a total adjustment to be made with respect to a timing threshold;
determining a number of increments of the incremental adjustment based on the analyzing.

8. The method of claim 1 wherein the applying comprises:
choosing an activated secondary serving cell with a lowest index value as a new timing reference serving cell;
applying the incremental adjustment with respect to the activated secondary serving cell with the lowest index value.

9. The method of claim 1 wherein the applying is based on at least one application rule.

10. The method of claim 9 wherein the at least one application rule provides an adjustment amount for each incremental step of the adjustment.

11. The method of claim 9 wherein the at least one application rule is associated with one or more of the following:
a bandwidth of transmitted signals;
a type of carrier aggregation scheme;
a user equipment activity factor;
a type of physical channel;
whether serving cells are co-located or not;
radio characteristics.

12. The method of claim 9 wherein the application rules are provided by the network node.

13. The method of claim 1 further comprising receiving at least one parameter associated with the incremental adjustment and utilizing the at least one parameter in the applying of the incremental adjustment.

14. The method of claim 13 wherein the at least one parameter is at least one of:
a maximum amount of magnitude in an uplink transmission timing change per increment;
a minimum aggregate uplink transmission timing adjustment rate;
a maximum aggregate uplink transmission timing adjustment rate.

15. The method of claim 1 wherein determining a change to a second timing reference serving cell comprises changing the timing reference serving cell for the group of serving cells from the first timing reference serving cell to the second timing reference serving cell.

16. A user equipment adapted to adjust a transmit timing of uplink transmissions to a network node in a telecommunications system, the user equipment configurable with more than one aggregated serving cells that are divided into one or more groups of serving cells based on a timing advance value of each of the aggregated serving cells, the one or more groups of serving cells each comprising a timing reference serving cell, wherein reception timing of a downlink transmission from a timing reference serving cell is used as a timing reference for the transmit timing of uplink transmissions for the serving cells in the group of serving cells comprising the timing reference serving cell, respectively, the user equipment comprising:
processing circuitry configured to:
determine a change to a second timing reference serving cell in a group of serving cells, the second timing reference serving cell being different from a first timing reference serving cell currently being used as the timing reference serving cell for the group of serving cells;
apply an incremental adjustment of the transmit timing of uplink transmissions for the serving cells in the group of serving cells with respect to a timing reference based on the reception timing of a downlink transmission from the second timing reference serving cell at the user equipment, wherein the incremental adjustment comprises two or more adjustments gradually applied in the incremental adjustment.

17. The user equipment of claim 16 wherein the processing circuitry is further configured to receive an adjustment request or an adjustment notification from the network node.

18. The user equipment of claim 16 wherein the processing circuitry is further configured to receive a triggering event based on at least one triggering rule.

19. The user equipment of claim 18:
wherein the at least one triggering rule is based on a timing threshold;
wherein the triggering event is provided when an adjustment in uplink transmission timing in response to the second timing reference serving cell would cause a change that is greater to or equal to the timing threshold.

20. The user equipment of claim 16 wherein the processing circuitry is further configured to apply an incremental advance or retreat of the uplink transmission timing.

21. The user equipment of claim 16 wherein the processing circuitry is further configured to:
analyze a total adjustment to be made with respect to a timing threshold;
determine a number of increments of the incremental adjustment based on the analysis.

22. The user equipment of claim 16 wherein the processing circuitry is further configured to choose an activated secondary serving cell with a lowest index value as a new timing reference serving cell;
apply the incremental adjustment with respect to the activated secondary serving cell with the lowest index value.

23. The user equipment of claim 16 wherein the processing circuitry is further configured to apply the incremental adjustment based on at least one application rule.

24. The user equipment of claim 23 wherein the at least one application rule provides an adjustment amount for each incremental step of the adjustment.

25. The user equipment of claim 23 wherein the at least one application rule is associated with one or more of the following:
a bandwidth of transmitted signals;
a type of carrier aggregation scheme;
a user equipment activity factor;
a type of physical channel;
whether serving cells are co-located or not;
radio characteristics.

26. The user equipment of claim 23 wherein the application rules are provided by the network node.

27. The user equipment of claim 16:
further comprising radio circuitry configured to receive at east one parameter associated with the incremental adjustment;
wherein the processing circuitry is configured to utilize the at least one parameter in the application of the incremental adjustment.

28. The user equipment of claim 27 wherein the at least one parameter is at least one of:
a maximum amount of magnitude in an uplink transmission timing change per increment;
a minimum aggregate uplink transmission timing adjustment rate;
a maximum aggregate uplink transmission timing adjustment rate.

29. The user equipment of claim 16 wherein the processing circuitry is further configured to determine a change to a second timing reference serving cell by changing the timing reference serving cell for the group of serving cells from the first timing reference serving cell to the second timing reference serving cell.

30. A method, in a network node, for determining information for adjusting a transmit timing of uplink transmissions of a user equipment in a telecommunications system, the user equipment configurable with more than one aggregated serving cells that are divided into one or more groups of serving cells based on a timing advance value of each of the aggregated serving cells, the one or more groups of serving cells each comprising a timing reference serving cell, wherein the reception timing of a downlink transmission from a timing reference serving cell at the user equipment is used as a timing reference for the transmit timing of uplink transmissions to the network node for the serving cells in the group of serving cells comprising the timing reference serving cell, respectively, the method comprising:
determining adjustment information for an incremental adjustment of the transmit timing of uplink transmissions for the serving cells in the group of serving cells with respect to a timing reference based on the reception timing of a downlink transmission from a second timing reference serving cell in the user equipment, the second timing reference serving cell being different from a first timing reference serving cell on which the timing reference is currently based, wherein the incremental adjustment comprises two or more adjustments gradually applied in the incremental adjustment.

31. The method of claim 30 further comprising transmitting the adjustment information to the user equipment.

32. The method of claim 31 wherein the transmitting is performed based on at least one triggering rule.

33. The method of claim 32 wherein the at least one triggering rule is based on a timing threshold.

34. The method of claim 30 further comprising selecting the second timing reference serving cell as the timing reference serving cell for a group of serving cells.

35. The method of claim 30 wherein the adjustment information is a request to apply an incremental adjustment of uplink transmission timing or a notification that a new timing reference serving cell is being utilized.

36. The method of claim 30 wherein the incremental adjustment is an advance or retreat of the uplink transmission timing.

37. The method of claim 30 wherein the adjustment information comprises a selected new timing, reference serving cell.

38. The method of claim 30 wherein the adjustment information comprises at least one parameter, the at least one parameter being at least one of:
a maximum amount of magnitude in an uplink transmission timing change per increment;
a minimum aggregate uplink transmission timing adjustment rate;
a maximum aggregate uplink transmission timing adjustment rate.

39. A network node for determining information for adjusting the transmit timing of uplink transmissions of a user equipment in a telecommunications system, the user equipment configurable with more than one aggregated serving cells that are divided into one or more groups of serving cells based on a timing advance value of each of the aggregated serving cells, the one or more groups of serving cells each comprising a timing reference serving cell, wherein the reception timing of a downlink transmission from a timing reference serving cell at the user equipment is used as a timing reference for the transmit timing of uplink transmissions to the network node for the serving cells in the group of serving cells comprising the timing reference serving cell, respectively, the network node comprising:
processing circuitry configured to determine adjustment information for an incremental adjustment of the transmit timing of uplink transmissions for the serving cells in the group of serving cells with respect to a timing reference based on the reception timing of a downlink transmission from a second tinning reference serving cell at the user equipment, the second timing reference serving cell being different from a first timing reference serving cell on which the timing reference is currently based, wherein the incremental adjustment comprises two or more adjustments gradually applied in the incremental adjustment.

40. The network node of claim 39 further comprising radio circuitry configured to transmit the adjustment information to the user equipment.

41. The network node of claim 40 wherein the radio circuitry is further configured to transmit the adjustment information based on at least one triggering rule.

42. The network node of claim 41 wherein the at least one triggering rule is based on a timing threshold.

43. The network node of claim 39 wherein the processing circuitry is further configured to select the second timing reference serving cell as the timing reference serving cell for a group of serving cells.

44. The network node of claim 39 wherein the adjustment information is a request to apply an incremental adjustment of uplink transmission timing or a notification that a new timing reference serving cell is being utilized.

45. The network node of claim 39 wherein the incremental adjustment is an advance or retreat of the uplink transmission timing.

46. The network node of claim 39 wherein the adjustment information comprises a selected new timing reference serving cell.

47. The network node of claim 39 wherein the adjustment information comprises at least one parameter, the at least one parameter being at least one of:
- a maximum amount of magnitude in an uplink transmission timing change per increment;
- a minimum aggregate uplink transmission timing adjustment rate;
- a maximum aggregate uplink transmission timing adjustment rate.

* * * * *

UNITED STATES PATENT AND TRADEMARK OFFICE
CERTIFICATE OF CORRECTION

PATENT NO. : 9,503,994 B2
APPLICATION NO. : 13/583505
DATED : November 22, 2016
INVENTOR(S) : Bergström et al.

It is certified that error appears in the above-identified patent and that said Letters Patent is hereby corrected as shown below:

In the Specification

In Column 3, Line 16, delete "(PDCCH)." and insert -- (PDSCH). --, therefor.

In Column 3, Line 33, delete "521," and insert -- 521. --, therefor.

In Column 12, Line 26, delete "Also" and insert -- Also, --, therefor.

In Column 12, Line 57, delete "time," and insert -- time; --, therefor.

In Column 15, Line 49, delete "131" and insert -- D1 --, therefor.

In Column 22, Line 16, delete "Also" and insert -- Also, --, therefor.

In Column 24, Line 46, delete "interoperability" and insert -- Interoperability --, therefor.

In the Claims

In Column 26, Line 67, in Claim 22, delete "to" and insert -- to: --, therefor.

In Column 27, Line 26, in Claim 27, delete "east" and insert -- least --, therefor.

In Column 28, Line 21, in Claim 37, delete "timing," and insert -- timing --, therefor.

In Column 28, Line 52, in Claim 39, delete "tinning" and insert -- timing --, therefor.

Signed and Sealed this
Twenty-second Day of October, 2019

Andrei Iancu
*Director of the United States Patent and Trademark Office*